(12) United States Patent
Yazaki et al.

(10) Patent No.: US 7,894,441 B2
(45) Date of Patent: Feb. 22, 2011

(54) PACKET FORWARDING DEVICE WITH PACKET FILTER

(75) Inventors: Takeki Yazaki, Hachioji (JP); Toshio Shimojo, Sagamihara (JP)

(73) Assignee: Alaxala Networks Corporation, Kanagawa (JP)

( * ) Notice: Subject to any disclaimer, the term of this patent is extended or adjusted under 35 U.S.C. 154(b) by 0 days.

(21) Appl. No.: 12/694,430

(22) Filed: Jan. 27, 2010

(65) Prior Publication Data

US 2010/0128729 A1 May 27, 2010

Related U.S. Application Data

(63) Continuation of application No. 11/366,443, filed on Mar. 3, 2006, now Pat. No. 7,680,114.

(30) Foreign Application Priority Data

Aug. 26, 2005 (JP) .............................. 2005-245236

(51) Int. Cl.
*H04L 12/56* (2006.01)
*H04J 3/24* (2006.01)
(52) U.S. Cl. ...................................... 370/392; 370/474
(58) Field of Classification Search ........................ None
See application file for complete search history.

(56) References Cited

U.S. PATENT DOCUMENTS

| | | | |
|---|---|---|---|
| 6,105,027 A * | 8/2000 | Schneider et al. .................. | 1/1 |
| 6,628,653 B1 * | 9/2003 | Salim ......................... | 370/389 |
| 6,874,026 B2 * | 3/2005 | Maria et al. .................. | 709/225 |
| 7,299,296 B1 * | 11/2007 | Lo et al. ...................... | 709/238 |
| 2002/0032797 A1 | 3/2002 | Xu | |
| 2002/0176426 A1 | 11/2002 | Asano et al. | |
| 2003/0002438 A1 | 1/2003 | Yazaki et al. | |
| 2004/0030776 A1 * | 2/2004 | Cantrell et al. .............. | 709/224 |

OTHER PUBLICATIONS

S. Suzuki, "The Operation for Checking the Headers", Nikkei Network, Jun. 19, 2001, No. 15, pp. 100-103, Nikkei Business Publications, Inc.
P. Ferguson, IETF RFC 2827: Network Ingress Filtering: Defeating Denial of Service Attacks which employ IP Source Address Spoofing, May 2000, pp. 1-8.
F. Baker, IETF RFC 1812: Requirements for IP Version 4 Routers, 5.3 Specific Issues, Jun. 1995, pp. 66-80.

* cited by examiner

*Primary Examiner*—Chirag G Shah
*Assistant Examiner*—Amarnauth Persaud
(74) *Attorney, Agent, or Firm*—Mattingly & Malur, P.C.

(57) ABSTRACT

To provide a packet forwarding device which minimizes degradation in packet forwarding performance at the time of execution of filtering there is provided a technique in which a destination decision processing unit of a destination decision and filtering unit decides whether to execute filtering on the basis of at least one of an input interface, an input port number, an output interface, and an output port number of an input packet and a plurality of pieces of information constituting the header of the packet. A filtering unit executes filtering only for a packet for which execution of filtering is decided. The packet forwarding device with the destination decision and filtering unit need not execute filtering for all packets and can minimize degradation in packet forwarding performance caused by filtering.

6 Claims, 12 Drawing Sheets

ROUTING TABLE 500

| ADDRESS | IP ADDRESS CONDITION | INTERFACE NUMBER | NEXT HOP IP ADDRESS | PORT NUMBER | |
|---|---|---|---|---|---|
| 1 | 15.16.17.0/24 | 1 | 12.13.1.1 | 1 | 501-1 |
| 2 | 18.19.20.0/24 | 2 | 13.14.1.2 | 2 | 501-2 |
| 3 | 14.15.0.0/16 | 1 | 12.13.1.1 | 1 | 501-3 |
| 4 | 16.17.0.0/16 | 2 | 13.14.1.1 | 2 | 501-4 |
| 5 | 19.20.0.0/16 | 3 | 11.12.1.1 | 3 | 501-5 |

EXECUTION INFORMATION TABLE 1000-A

| ADDRESS | EXECUTION INFORMATION | |
|---|---|---|
| 1 | Off | ∼1001-A1 |
| 2 | Off | ∼1001-A2 |
| 3 | On | ∼1001-A3 |

EXECUTION DECISION UNIT 115

EXECUTION INFORMATION TABLE 1000-C

| ADDRESS | SIP CONDITION | DIP CONDITION | INPUT PORT NUMBER CONDITION | |
|---|---|---|---|---|
| 1 | 19.20.1.1/32 | 14.15.1.1/32 | 3 | ~1001-C1 |
| 2 | | | | |
| 3 | | | | |

PACKET FORWARDING DEVICE WITH PACKET FILTER

INCORPORATION BY REFERENCE

The present application is a continuation of U.S. application Ser. No. 11/366,443, filed Mar. 3, 2006, which claims priority from Japanese application JP2005-245236 filed on Aug. 26, 2005, the content of which is hereby incorporated by reference into this application.

BACKGROUND OF THE INVENTION

The technical field of the present invention relates to a packet forwarding device with high-speed filtering means.

Distributed Denial of Service (DDoS) attacks which transmit invalid packets to cause waste of the bandwidth resources of a network and overloading of a public server are becoming a serious problem. Since an attacker often transmits a packet whose source address is spoofed to prevent traceback to the source, detection and discarding of such a spoofed packet by a packet forwarding device is effective in preventing a Distributed Denial of Service attack.

As a technique for detecting and discarding a spoofed packet, there is available filtering in a packet forwarding device. As an example of filtering, there is known filtering in loose mode described in IETF RFC 2827: "Network Ingress Filtering: Defeating Denial of Service Attacks which employ IP Source Address Spoofing." IETF RFC 2827 describes that packets passing through a packet forwarding device are limited to ones with a known advertised prefix. A prefix here refers to the high-order bits of an address and is information indicating a network.

Other examples of filtering include filtering in strict mode described in IETF RFC 1812: "Requirements for IP Version 4 Routers." The document describes that if an interface of a packet forwarding device from which a packet is input (to be referred to as an input interface) is different from an interface to which data is to be output in order for the data to reach the source address of the packet, the packet needs to be discarded.

In many cases, a spoofed packet contains an unknown unadvertised prefix or an interface to which data is to be output in order for the data to reach the source address is different from the input interface. Accordingly, execution of filtering described above by a packet forwarding device makes it possible to greatly reduce the number of spoofed packets.

SUMMARY OF THE INVENTION

Filtering processing in loose mode can be implemented by extending destination decision means for deciding an interface to which a packet is to be output. Destination decision means stores an advertised prefix and an interface corresponding to the prefix. When a packet is input, the destination decision means searches for a prefix matching the destination IP address in the header of the packet and decides that an interface corresponding to the matching prefix is an interface to which the packet is to be transmitted. To implement filtering in loose mode, it suffices that the destination decision means is so extended as to compare prefixes with not the destination address but the source address of a packet to retrieve a matching one and discard the packet if there is no matching one.

Filtering in strict mode is also implemented by extending destination decision means. To implement this filtering, it suffices that destination decision means is so extended as to decide an interface corresponding to a prefix matching the source address of a packet and discard the packet if the interface is different from the input interface.

As described above, a packet forwarding device with filtering to which the techniques of IETF RFC 2827 and IETF RFC 1812 are applied needs not only to compare prefixes with a destination IP address to retrieve a matching one but also to compare prefixes with a source IP address for filtering. Since two types of prefix/IP address comparisons need to be made, the extended destination decision means of the packet forwarding device can process only half as many packets as those processed without filtering. For this reason, execution of filtering makes the packet forwarding performance of a router with the means lower than that without filtering.

Under the circumstances, there has been considered a packet forwarding device which minimizes degradation in packet forwarding performance and performs processing at higher speed than a router to which the techniques of IETF RFC 2827 and IETF RFC 1812 are applied.

As at least one means for solving the above-described problem, there is provided a packet forwarding device which comprises a plurality of input ports and a plurality of output ports and a destination decision and filtering unit that manages address conditions indicating network address conditions and interfaces corresponding to the address conditions and executes a destination decision process of deciding that an interface corresponding to a first address condition matching a destination address in an input packet is an output interface and a filtering process of deciding that the packet is intended for "forwarding" if a second address condition matching a source address of the packet exists and executes the filtering process only for some of input packets.

Other problems, means, and effects will become apparent from an embodiment to be described later.

According to the solving means, filtering only for some of input packets minimizes degradation in performance at the time of execution of filtering and implements an improvement in performance.

DESCRIPTION OF THE EMBODIMENTS

An embodiment suitable for implementing the present invention will be explained below with reference to FIGS. 1 to 16. Note that the present invention is not limited to this embodiment.

(1) Overview of Network and Router

Figure 1:
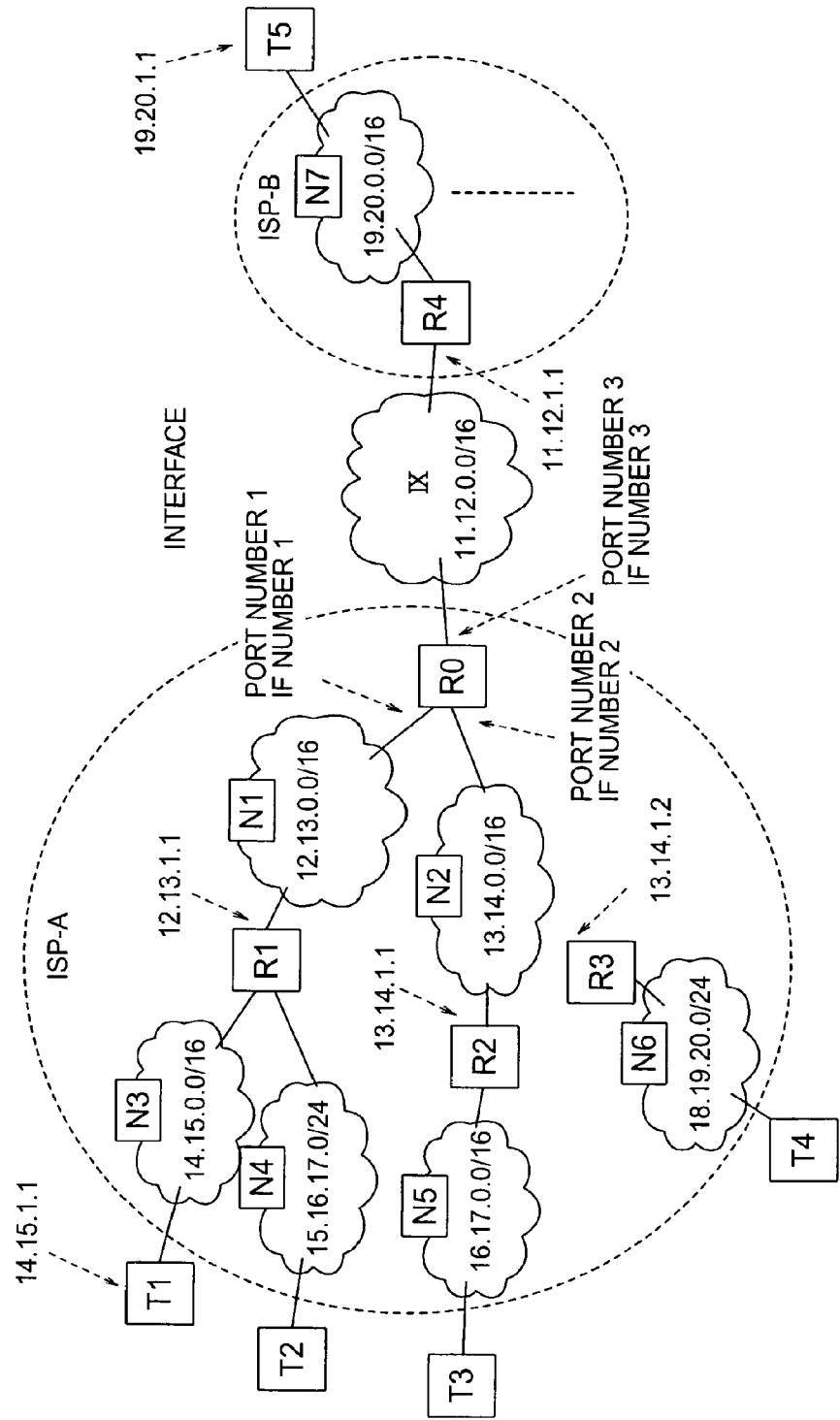
FIG. 1 is a block diagram showing an example of the configuration of a network in which networks of ISPs ISP-A and ISP-B are connected at an IX.

An example of a network to be considered in this embodiment will be explained with reference to FIG. 1. In FIG. 1, networks of ISPs ISP-A and ISP-B are connected through an IX. Note that ISP is an abbreviation for Internet Service Provider. The network of the ISP ISP-A is divided into six networks N1 to N6 using four routers R0 to R3 while the network of the ISP ISP-B is divided into a plurality of networks including a network N7. The IP addresses of the networks N1 to N7 are 12.13.0.0/16, 13.14.0.0/16, 14.15.0.0/16, 15.16.17.0/24, 16.17.0.0/16, 18.19.20.0/24, and 19.20.0.0/16, respectively. Characters (including numeric characters) before "/" of each address represent an IP address, and numeric characters after "/" represent the bit length (prefix length) of the IP address. For example, the prefix of the IP address of 12.13.0.0/16 is "12.13." Note that although the network of the ISP ISP-B has one or more networks in addition to the network N7, the networks are omitted for the sake of illustrative simplicity.

A port of the router R1 leading to the network N1, a port of the router R2 leading to the network N2, a port of the router R3 leading to the network N2, and a port of a router R4 leading to the IX are assigned, as IP addresses, 12.13.1.1, 13.14.1.1, 13.14.1.2, and 11.12.1.1, respectively. The networks N3 to N7 accommodate respective terminals T1 to T5. The router R0 executes filtering for a packet originating from any of the terminals T1 to T4 and destined for the network of the ISP ISP-B. The router R0 has a plurality of ports and manages networks (the networks N1 and N2 and the IX) directly connected to the ports, whose port numbers are 1, 2, and 3, respectively, using the numbers of interfaces (to be referred to as interface numbers), 1, 2, and 3. The router R0 discards a packet input from the network N1 if the packet contains a source IP address which does not belong to any of the networks N1, N3, and N4 and discards a packet input from the network N2 if the packet contains a source IP address which does not belong to any of the networks N2, N5, and N6.

The overview of the configuration and operation of a router 200 used as the router R0 will be explained next with reference to FIGS. 2, 3, 4, and 5.

Figure 2:
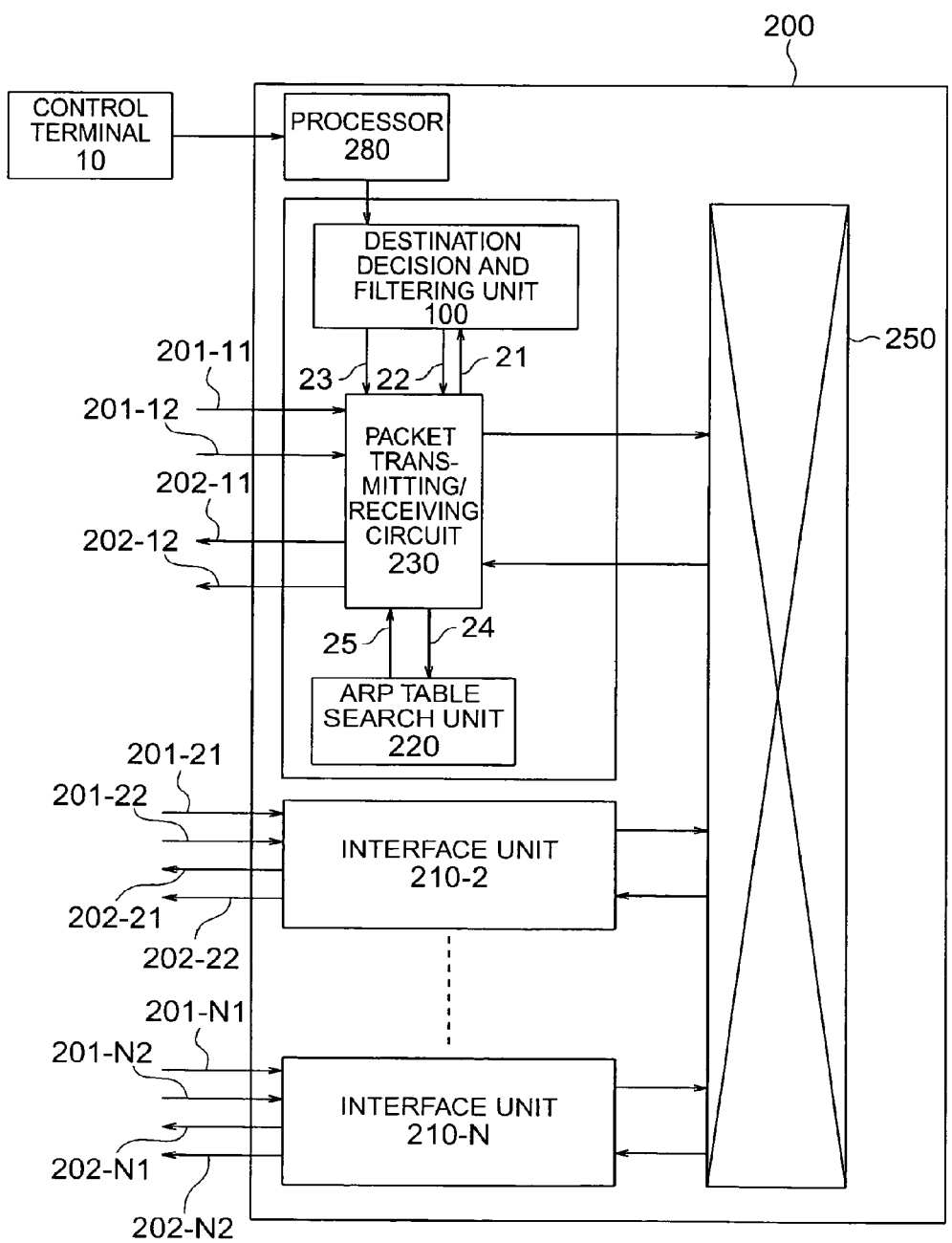
FIG. 2 is a block diagram showing an example of the configuration of a router 200.

FIG. 2 shows a block diagram of the router 200. The router 200 is composed of N interface units 210, any of which is denoted by 210-i (i=1 to N), 2N input ports 201, any of which is denoted by 201-ij (i=1 to N, j=1 or 2) accommodated by a corresponding one of the interface units 210, 2N output ports 202, any of which is denoted by 202-ij, one packet forwarding unit 250 which couples the interface units 210 together, and one processor 280. Each interface unit 210-i is composed of a packet transmitting/receiving circuit 230 which executes the process of transmitting and receiving packets, a destination decision and filtering unit 100 characteristic of this embodiment, and an ARP table search unit 220. In the following description, the input ports 201 and output ports 202 and lines connecting the packet transmitting/receiving circuits 230 and the packet forwarding unit 250 will be distinguished from each other by generically referring to the former ones as extra-device ports and the latter ones as intra-device lines. Units include hardware (a semiconductor circuit or the like) which executes a program.

Figure 3:
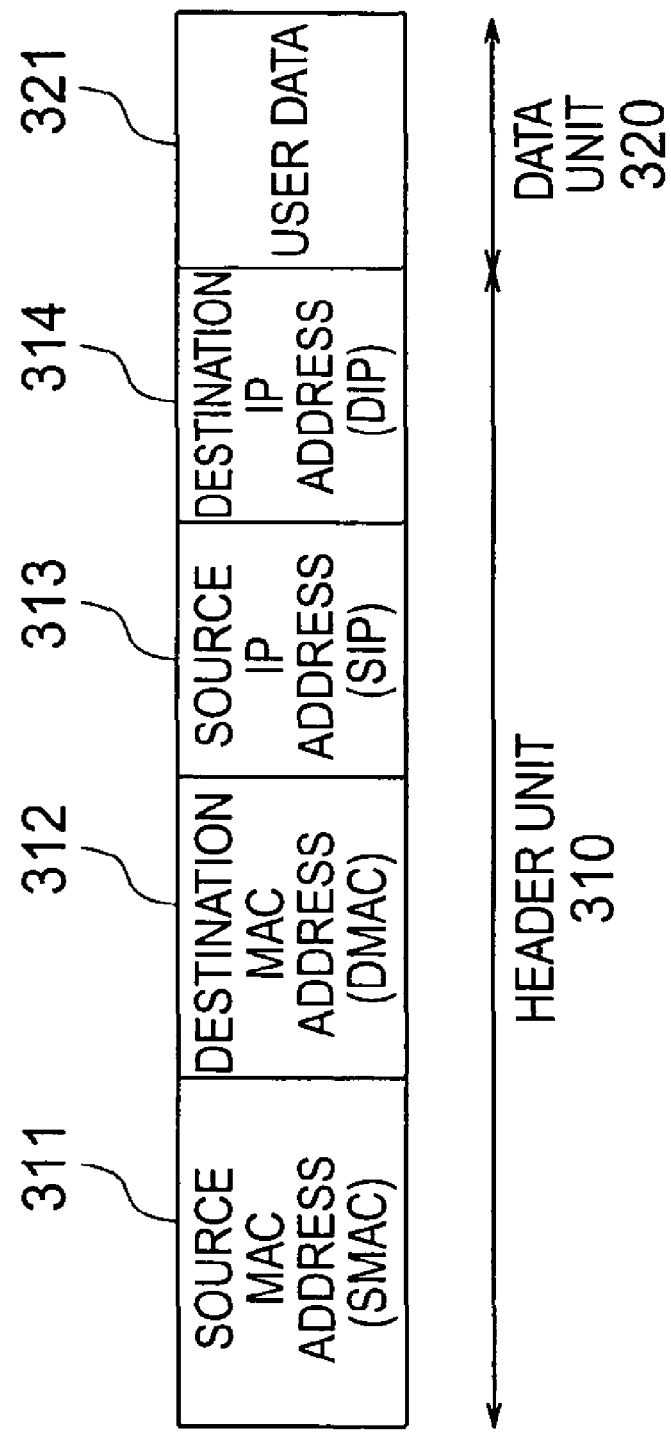
FIG. 3 is a block diagram showing an example of the format of a packet to be transmitted or received by the router 200.

FIG. 3 shows an example of the format of a packet input from each of the input ports 201 or output to each of the output ports 202 in FIG. 2. The format is composed of a header unit 310 and a data unit 320. The data unit 320 is composed of user data 321. The header unit 310 is composed of a Source MAC Address 311 (to be referred to as a SMAC hereinafter) which is a source address at the data link layer, a Destination MAC Address 312 (to be referred to as a DMAC hereinafter) which is a destination address, a Source IP Address 313 (to be referred to as a SIP hereinafter) which is a source address (the address of a transmitting terminal) at the network layer, and a Destination IP Address 314 (to be referred to as a DIP hereinafter) which is a destination address (the address of a receiving terminal).

Figure 4:
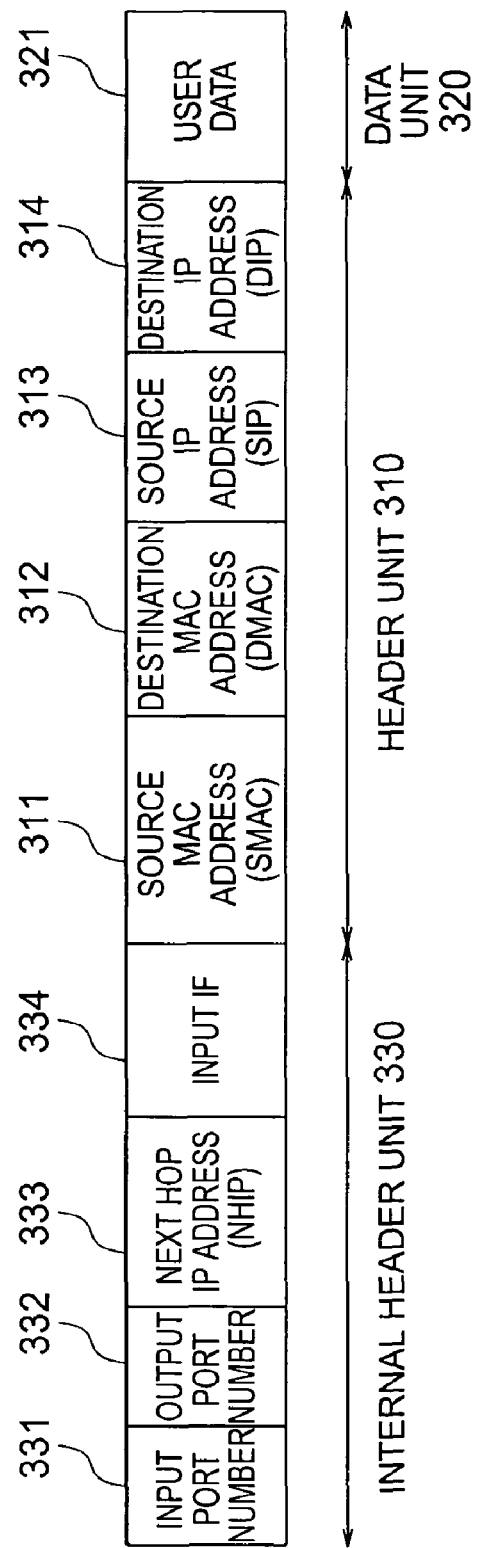
FIG. 4 is a block diagram showing an example of the format of a packet used internally in the router 200.

FIG. 4 shows an example of the format of a packet used internally in the router 200 in FIG. 2. The format is obtained by adding an internal header unit 330 to the above-described format. The internal header unit 330 is composed of an input port number 331 which is the number of a port from which a packet is input, an output port number 332 which is the number of a port to which the packet is to be output, a Next Hop IP Address 333 (to be referred to as an NHIP hereinafter) which is the IP address of the next router or terminal that is to receive the packet, and an input IF 334 which is the number of an interface from which the packet is input (to be referred to as an input interface number). The output port number 332, the Next Hop IP Address 333, the number of an interface (not shown) to which the packet is to be output (output interface number), and the like are generically referred to as output destination information.

Figure 5:
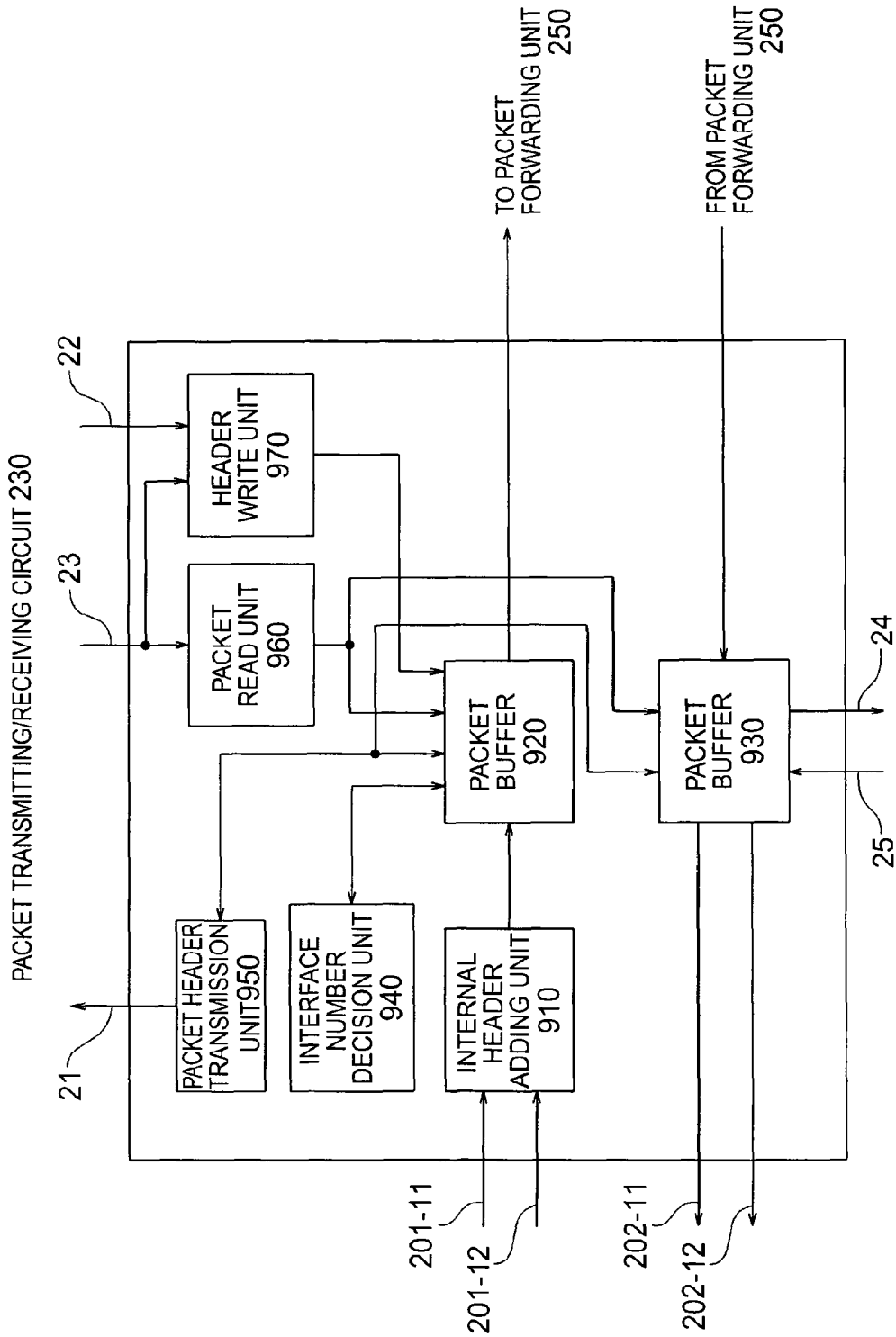
FIG. 5 is a block diagram showing an example of the configuration of a packet transmitting/receiving circuit 230 of the router 200.

FIG. 5 shows the details of the packet transmitting/receiving circuit 230 shown in FIG. 2. The packet transmitting/receiving circuit 230 will also be considered as a combination of a packet transmitting unit and a packet receiving unit. When the packet transmitting/receiving circuit 230 receives a packet in the format in FIG. 3 from one of the input ports 201, an internal header adding unit 910 adds the internal header unit 330 in FIG. 4, stores, in the field for the input port number 331, the number of a port from which the packet is input, and writes the packet into a packet buffer 920. An interface number decision unit 940 decides, from information contained in the stored packet, the number of an interface from which the packet is input (to be referred to as an input interface number) and writes the input interface number in the field for the input IF 334 of the internal header unit 330. A packet header transmission unit 950 transmits information of the header unit 310 and internal header unit 330 of the packet in the packet buffer 920 to the destination decision and filtering unit 100 as packet header information 21. Note that at this time, the output port number 332 and the NHIP 333 each have a nonsensical value.

The input port number 331, input IF 334, and the like are generically referred to as input information or input source information for the packet receiving unit.

An interface here refers to a network directly connected to a router. The router 200 assigns networks respective unique interface numbers and manages them using the numbers. In this embodiment, the networks N1 and N2 and the IX are connected to input ports of the router 200 serving as the router R0, and interface numbers of 1, 2, and 3 are assigned to the networks, respectively. Since port numbers and interface numbers correspond one to one, each packet transmitting/receiving circuit 230 can decide an input interface number using a corresponding input port number. For example, if the router 200 serving as the router R0 receives a packet originating from the terminal T1 through the input port connected to the network N1, the packet transmitting/receiving circuit 230 can decide from the input port number of 1 that the input interface number is 1. If the input port is an ATM port or Ethernet (registered trademark) port, and a network connected to the input port is divided into a plurality of networks with different VPI/VCI values or VLAN ID values, the interface number decision unit 940 only needs to decide the interface number on the basis of a VPI/VCI pair in an ATM header, a VLAN ID in an Ethernet header, or the like, in addition to the input port number.

The destination decision and filtering unit 100 in FIG. 2 receives the packet header information 21 from the packet transmitting/receiving circuit 230 and executes filtering on the input side (to be referred to input-side filtering). The destination decision and filtering unit 100 manages prefixes and interfaces corresponding to the prefixes and executes destination decision processing and filtering. In the destination decision processing, the destination decision and filtering unit 100 compares the prefixes with the DIP 314 in the packet header information 21 to retrieve a matching one, decides the number of an interface to which the input packet is to be output (to be referred to as an output interface number), a next hop IP address, and an output port number, and transmits the pieces of information to the packet transmitting/receiving circuit 230 as packet output port information 22. For example, if a packet originating from the terminal T1 and destined for the network of the ISP ISP-B is received, the output interface number, the next hop IP address, and the output port number of the packet are 3, 11.12.1.1, and 3, respectively.

As will be explained in detail later, the destination decision and filtering unit 100 characteristically includes an execution decision unit 115 (FIG. 6) which stores whether to turn on or off filtering for each output interface. To execute filtering only for a packet destined for the IX, the execution decision unit of the router R0 stores pieces of On/Off information of Off, Off, and On, respectively, for the output interfaces (interfaces Nos. 1, 2, and 3) and decides "execution" of filtering only for a packet to be output to interface No. 3 as the output interface. Decision of turn-on or execution of filtering will also be referred to as decision of "Filtering," and decision of turn-off or non-execution will also be referred to as decision of "No Filtering."

In the filtering, the destination decision and filtering unit 100 first decides a second input interface number that is the number of an interface from which the packet with the SIP 313 should have been input. The destination decision and filtering unit 100 then compares the input interface number in the packet header information 21 with the second input interface number. If the numbers match each other, the destination decision and filtering unit 100 decides that the packet in the packet transmitting/receiving circuit 230 is intended for "forwarding." Otherwise, it decides that the packet is intended for "discard." The destination decision and filtering unit 100 transmits filtering information 23 indicating "forwarding" or "discard" to the packet transmitting/receiving circuit 230. If filtering is not executed, the destination decision and filtering unit 100 transmits the filtering information 23 indicating "forwarding" to the packet transmitting/receiving circuit 230.

For example, if the router R0 receives a packet originating from the terminal T1 and destined for the network of the ISP ISP-B, a corresponding one of the destination decision and filtering units 100 first decides that the output interface number of the packet is 3 and decides "execution" of filtering. If the source IP address of the packet having been transmitted by the terminal T1 belongs to the network N3 or N4, a second input interface number and an input interface number decided by the interface number decision unit 940 both become 1, and thus, the destination decision and filtering unit 100 decides that the packet is intended for "forwarding." On the other hand, assume that the terminal T1 is an attacker and that the source address of the packet to be transmitted belongs to any one other than the networks N1, N3, and N4. In this case, if the source address belong to, e.g., the network N2, the second input interface number becomes 2, and the destination decision and filtering unit 100 decides that the packet is intended for "discard." If the router R0 receives a packet originating from the terminal T1 to be forwarded to the terminal T4 through the router R0, the destination decision and filtering unit 100 decides that the output interface number of the packet is 2 and decides "non-execution" of filtering.

A packet read unit 960 and a header write unit 970 of the packet transmitting/receiving circuit 230 in FIG. 5 receive the filtering information 23 from the destination decision and filtering unit 100. If the filtering information 23 indicates "forwarding," the header write unit 970 writes the output port number and next hop IP address in the packet output port information 22 in the fields for the output port number 332 and NHIP 333 in FIG. 4, respectively. The packet read unit 960 reads out the stored packet from the packet buffer 920 and transmits it to the packet forwarding unit 250. On the other hand, if the filtering information 23 indicates "discard," the packet read unit 960 does not transmit the packet to the packet forwarding unit 250. Accordingly, the stored packet is overwritten with a packet arriving next and finally discarded. Note that instructions for "discard" include not only positive ones to execute discarding but also negative ones to disallow forwarding.

Upon receipt of the packet from the packet transmitting/receiving circuit 230, the packet forwarding unit 250 in FIG. 2 transmits the packet to the packet transmitting/receiving circuit 230 of one of the interface units 210 corresponding to the output port number 332 contained in the packet. The packet transmitting/receiving circuit 230 having received the packet from the packet forwarding unit 250 stores the packet in the packet buffer 930 in FIG. 5. The packet header transmission unit 950 transmits information in the internal header unit 330 and header unit 310 of the packet stored in the packet buffer 930 to the destination decision and filtering unit 100 as the packet header information 21.

Upon receipt of the packet header information 21 from the packet transmitting/receiving circuit 230, the destination decision and filtering unit 100 in FIG. 2 executes filtering on the output side (to be referred to as output-side filtering). The destination decision and filtering unit 100 has a piece of filtering On/Off information for each input interface used in output-side filtering in addition to pieces of filtering On/Off information for respective output interfaces used in input-side filtering. The destination decision and filtering unit 100 executes filtering on the basis of a piece of On/Off information corresponding to the input interface and transmits the filtering information 23 indicating "forwarding" or "discard" to the packet transmitting/receiving circuit 230.

This example assumes that each execution decision unit 115 (FIG. 6) of the router R0 stores pieces of On/Off information, all of which are Off, for the input interfaces (interfaces Nos. 1, 2, and 3). Accordingly, filtering is not executed, and the destination decision and filtering unit 100 transmits the filtering information 23 indicating "forwarding" to the packet transmitting/receiving circuit 230. By executing filtering for a packet only if a piece of On/Off information corresponding to the input interface number of the packet is On, as described above, the efforts in searching for a prefix matching the source IP address in the packet is minimized, and an increase in speed is implemented as compared with IETF RFC 2827. When filtering is to be executed only for a packet input from a specific input interface, a piece of On/Off information corresponding to the input interface is set to On. This case will be described later. If the filtering information 23 indicates "discard," the packet read unit 960 of the packet transmitting/receiving circuit 230 in FIG. 5 does not transmit the packet in the packet buffer 930 to the corresponding one of the output ports 202, and thus, the packet is overwritten with the next one and discarded.

Upon receipt of the filtering information 23 indicating "forwarding" from the destination decision and filtering unit 100, the packet transmitting/receiving circuit 230 in FIG. 5 transmits the NHIP 333 of the internal header unit 330 in FIG. 4 to the ARP table search unit 220 in FIG. 2 as next hop IP address information 24. The ARP table search unit 220 has a next hop MAC address corresponding to the next hop IP address information 24. Upon receipt of the information 24, the ARP table search unit 220 transmits the corresponding MAC address to the packet transmitting/receiving circuit 230 as next hop MAC address information 25. As for the header unit 310 in FIG. 4, the packet transmitting/receiving circuit 230 writes the MAC address in the next hop MAC address information 25 in the field for the DMAC 312 and a MAC address assigned to the one of the output ports corresponding to the output port number 332 of the internal header unit 330 in the field for the SMAC 311. The packet transmitting/receiving circuit 230 deletes the internal header unit 330 and transmits the stored packet to the one of the output ports 202 corresponding to the output port number 332.

(2) Details of Destination Decision and Filtering Unit of Router

A detailed example of operation at the time of input-side filtering of the destination decision and filtering unit 100 shown in FIG. 2 will be explained with reference to the block diagram in FIG. 6 and the flowchart in FIG. 7.

Figure 6:
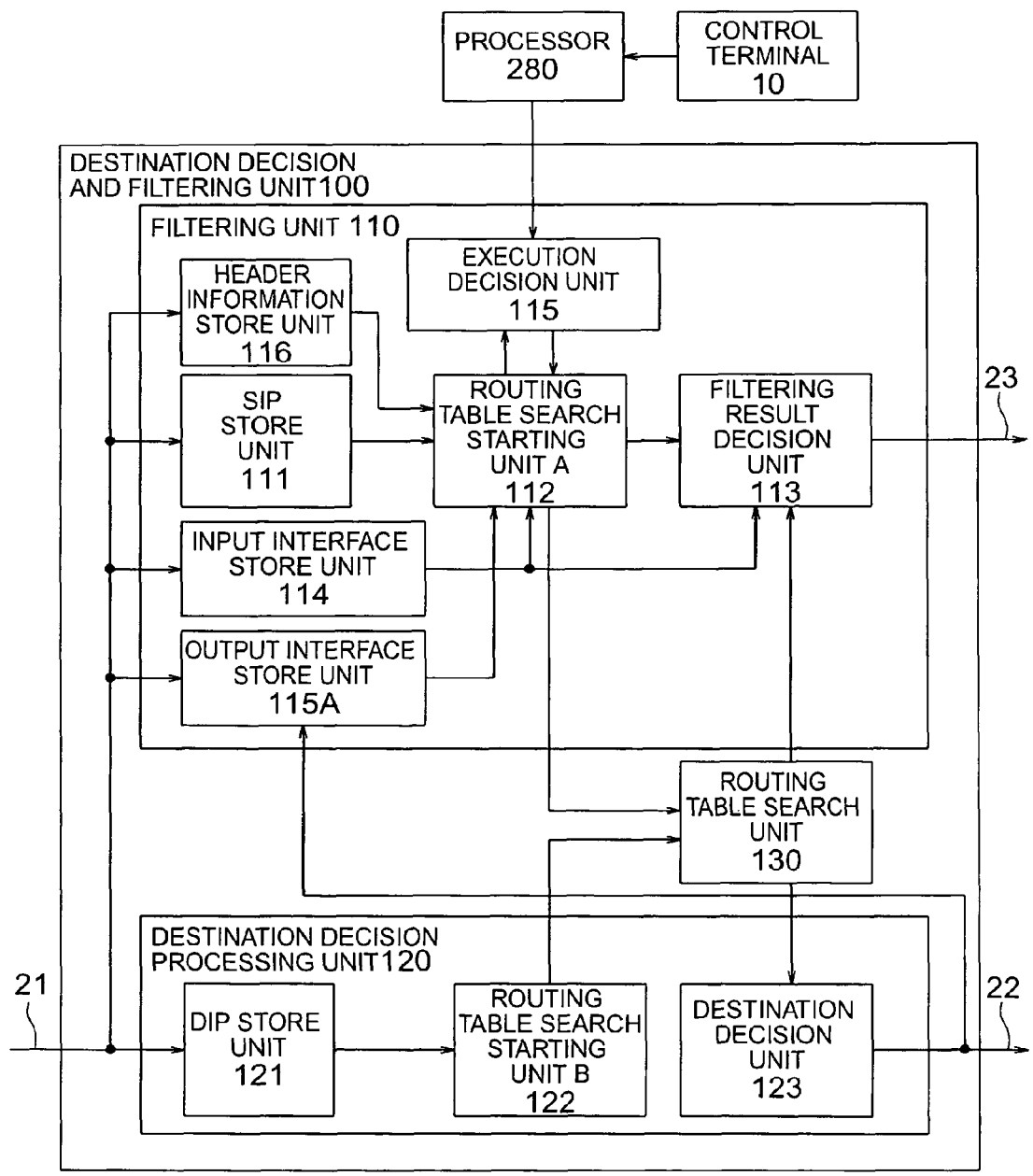
FIG. 6 is a block diagram showing an example of the configuration of a destination decision and filtering unit 100 of the router 200.
Figure 7:
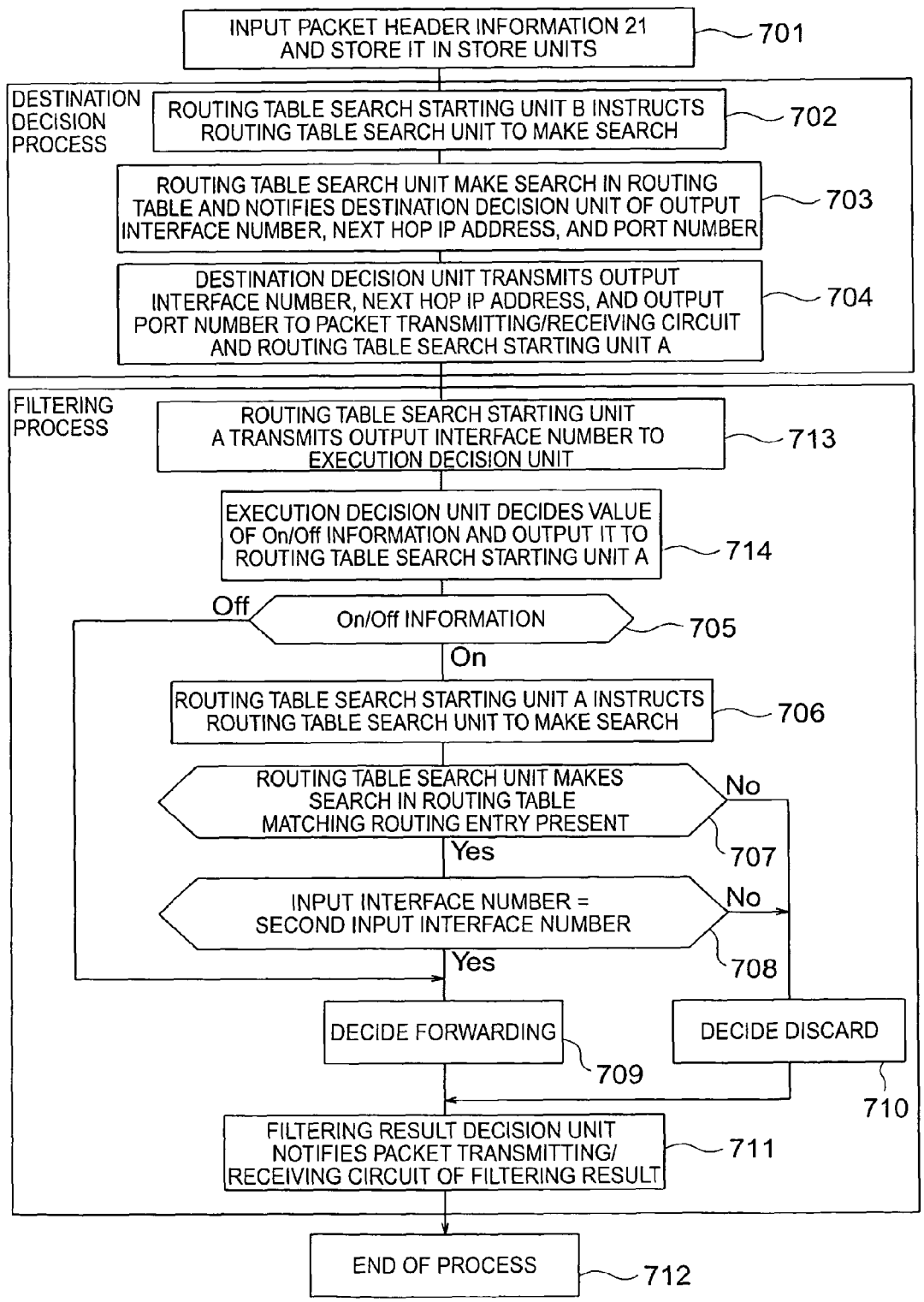
FIG. 7 is a flowchart showing an example of input-side filtering processing of the destination decision and filtering unit 100.

As shown in FIG. 6, the destination decision and filtering unit 100 is composed of a destination decision processing unit 120 which executes destination decision processing, a filtering unit 110 which executes filtering, and a routing table search unit 130 which has a routing table 500 storing prefixes and interfaces corresponding to the prefixes and compares the prefixes with an input IP address to retrieve a matching one.

Upon receipt of the packet header information 21, the destination decision and filtering unit 100 stores the SIP 313, DIP 314, and input interface information in a SIP store unit 111, a DIP store unit 121, and an input interface store unit 114, respectively, and stores all pieces of information in the packet header information 21 in a header information store unit 116 (step 701).

Figures 8, 9:
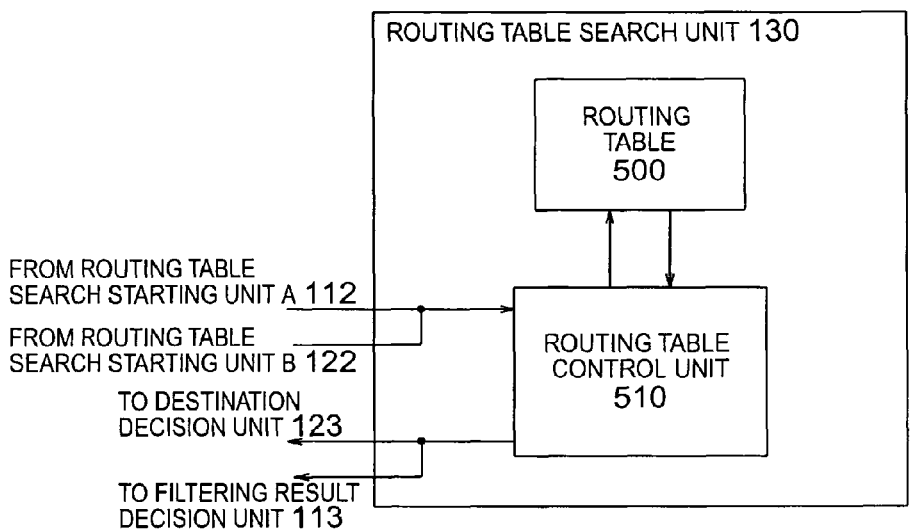
FIG. 8 is a block diagram showing an example of the configuration of a routing table search unit 130 of the destination decision and filtering unit 100.
FIG. 9 is a table chart showing an example of the format and setting of a routing table 500 of the routing table search unit 130.

Next, a routing table search starting unit B denoted by reference numeral 122 instructs the routing table search unit 130 to make a search in the routing table and transmits the DIP 314 in the DIP store unit as search key information (step 702). FIG. 8 shows the details of the routing table search unit 130; and FIG. 9, an example of the routing table 500 of the routing table search unit 130. The routing table 500 stores N routing entries 501, any of which is denoted by 501-i (i=1 to N) and stores an IP address condition, an interface number corresponding to the IP address condition, a next hop IP address, and a port number, in descending order of the prefix length of the IP address conditions.

Upon receipt of an instruction to make a search in the routing table and the DIP 314 from the routing table search starting unit B (122), a routing table control unit 510 of the routing table search unit 130 sequentially reads out the routing entries 501 from the routing table 500 in order from one with the smallest address. The routing table control unit 510 compares the prefix of each read-out IP address condition with a part of the DIP 314 of length equal to the prefix length. The routing table control unit 510 transmits an interface number, next hop IP address, and port number corresponding to a matching IP address condition retrieved first to a destination decision unit 123 (step 703). The destination decision unit 123 decides that the received pieces of information are the output interface number, next hop IP address, and output port number, respectively, of a packet in the packet transmitting/receiving circuit 230 and transmits them to the packet transmitting/receiving circuit 230 and a routing table search starting unit A denoted by reference numeral 112 as the packet output port information 22 (step 704).

If a packet destined for the terminal T5 connected to the network of the ISP ISP-B is received from any of the terminals T1 to T4, the destination IP address of the packet matches only the IP address condition of a routing entry 501-5. Accordingly, the destination decision unit 123 decides that the output interface number, next hop IP address, and output port number of the packet are 3, 11.12.1.1, and 3, respectively. The destination decision unit 123 decides upon receipt of a packet destined for the terminal T1 or T2 that the output interface number, next hop IP address, and output port number of the packet are 1, 12.13.1.1, and 1, respectively, decides upon receipt of a packet destined for the terminal T3 that the output interface number, next hop IP address, and output port number of the packet are 2, 13.14.1.1, and 2, respectively, and decides upon receipt of a packet destined for the terminal T4 that the output interface number, next hop IP address, and output port number of the packet are 2, 13.14.1.2, and 2, respectively.

Upon receipt of the output interface number from the destination decision unit 123, the routing table search starting unit A (112) transmits the information to the execution decision unit 115 (step 713). The execution decision unit 115 transmits a piece of On/Off information for the output interface to the routing table search starting unit A (112) (step 714).

More specifically, for example, if the router R0 receives a packet destined for the terminal T5, the output interface number of the packet is 3, and thus, the execution decision unit 115 transmits a piece of On/Off information of On to the routing table search starting unit A (112). On the other hand, if the router R0 receives a packet destined for any of the terminals T1 to T4, the output interface number of the packet is 1 or 2, and thus, the execution decision unit 115 transmits a piece of On/Off information of Off to the routing table search starting unit A (112).

Figures 10, 11:
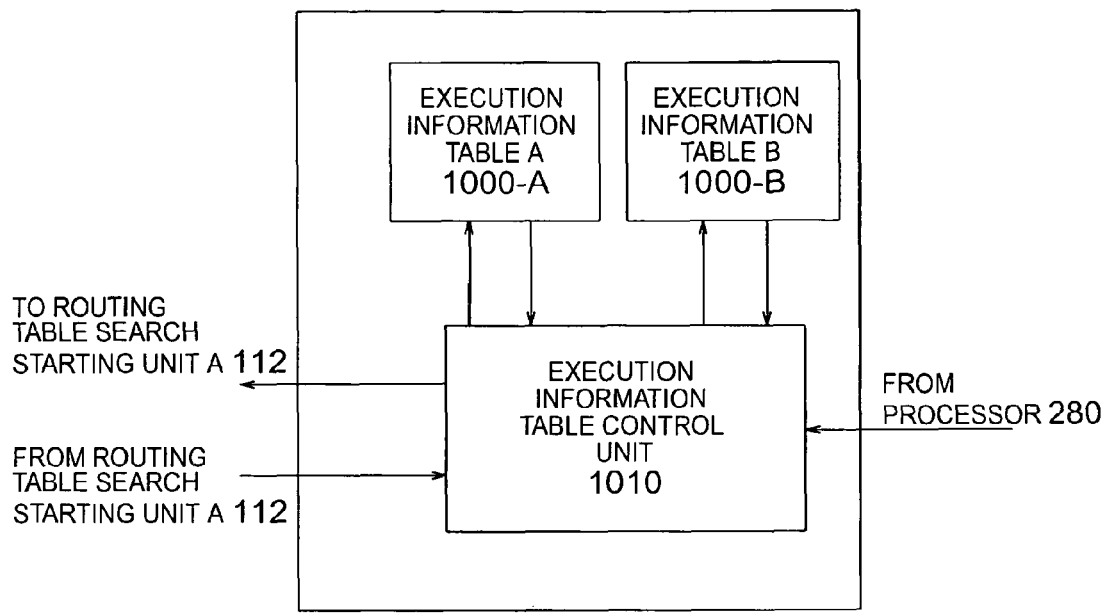
FIG. 10 is a block diagram showing an example of the configuration of an execution decision unit 115 of the destination decision and filtering unit 100.
FIG. 11 is a table chart showing an example of an execution information table 1000-A of the execution decision unit 115.

(2-1) FIG. 10 shows the details of the execution decision unit 115. The execution decision unit 115 is composed of an execution information table 1000-A which stores a piece of On/Off information for each output interface, an execution information table 1000-B which stores a piece of On/Off information for each input interface, and an execution information table control unit 1010. The execution information tables 1000-A and 1000-B have the same format. The execution information table 1000-A is used at the time of input-side filtering while the execution information table 1000-B is used at the time of output-side filtering. FIG. 11 shows an implementation example of the execution information table 1000-A. A corresponding piece of On/Off information is stored at an address equal to the number of each output interface. As for pieces of On/Off information in each execution information table 1000-A of the router R0 in FIG. 1, only a piece 1001-A3 of On/Off information for interface No. 3 is On, and the other pieces of On/Off information are Off. The execution information table control unit 1010 reads out a piece of On/Off information corresponding to the output interface number from the execution information table 1000-A and transmits the piece to the routing table search starting unit A (112).

The following processing branches depending on the piece of On/Off information received by the routing table search starting unit A (112) (step 705). If the piece of On/Off information is On, the routing table search starting unit A (112) instructs the routing table search unit 130 to make a search in the routing table 500 and transmits the SIP 313 in the SIP store unit as search key information (step 706). Upon receipt of the information, the routing table search unit 130 reads out the routing entries 501 from the routing table 500 in order from one with the smallest address in the same manner as in the process in step 703. The routing table search unit 130 compares each read-out IP address condition with the SIP 313 and transmits an interface number corresponding to a matching IP address condition retrieved first to a filtering result decision unit 113 as a second input interface number. If there is no routing entry 501-i storing a matching IP address condition, the routing table search unit 130 notifies the filtering result decision unit 113 that there is no matching routing entry 501-i (step 707).

The routing table search unit 130 decides upon receipt of a packet which contains an IP address belonging to the network N3 or N4 in FIG. 1 as a source IP address that the input interface number is 1, decides upon receipt of a packet with a network IP address belonging to the network N5 or N6 that the input interface number is 2, decides upon receipt of a packet with a network IP address belonging to the network N7 that the input interface number is 3, and decides upon receipt of a packet with any other IP address that there is no matching entry. If there is any matching routing entry 501-i, the process branches depending on whether or not the input interface number matches the second input interface number (step 708). If the input interface number is equal to the second input interface number, the filtering result decision unit 113 decides that the packet is intended for "forwarding" because the packet in the packet transmitting/receiving circuit 230 is input from a valid input interface (step 709). On the other hand, if the interface numbers are not equal to each other, the filtering result decision unit 113 decides that the packet is intended for "discard" because the packet is input from an invalid input interface (step 710). If there is no matching entry 501-i, step 708 is skipped, and the filtering result decision unit 113 decides that the packet is intended for "discard" (step 710).

For example, if the terminal T1 transmits a packet with an IP address belonging to the network N3 as a source IP address, the source IP address matches the IP address condition of a routing entry 501-3, and thus, the destination decision unit 123 decides that the input interface number of the packet is 1. Since this number matches the second input interface number, the filtering result decision unit 113 decides that the packet is intended for "forwarding." If the terminal T1 transmits a packet with an IP address belonging to any of the networks N5 to N7 as a source IP address, the destination decision unit 123 decides that the input interface number of the packet is 2 or 3. Since this number does not match the second interface number, i.e., 1, the filtering result decision unit 113 decides that the packet is intended for "discard." If the terminal T1 transmits a packet with an IP address belonging to any one other than the networks N1 to N7 and the IX as a source IP address, there is no routing entry 501-i with an IP address condition matching the source IP address. For this reason, the filtering result decision unit 113 decides that the packet is intended for "discard."

On the other hand, if the piece of On/Off information is Off in step 705, the filtering result decision unit 113 decides that the packet in the packet transmitting/receiving circuit 230 is intended for "forwarding" (step 709) and transmits the filtering information 23 indicating "forwarding" to the packet transmitting/receiving circuit 230 (step 711).

The processing described above is a processing operation in strict mode. A processing operation in loose mode is different only in that it does not include the branch in step 708. If an IP address condition matching the source IP address of the packet exists in the routing table 500 in step 707, it is only necessary to execute step 709 in which the filtering result decision unit 113 decides that the packet is intended for "forwarding."

As described above, the destination decision and filtering unit 100 of the present invention need not execute routing table search in step 707 if the piece of On/Off information is Off. For this reason, it is unnecessary to execute routing table search for filtering for all packets. This minimizes degradation in performance caused by filtering and implements an improvement in search performance over IETF RFC 2827.

In the above example, only input-side filtering which is intended for a packet received from one of the input ports 201 is executed, and output-side filtering which is intended for a packet received from the packet forwarding unit 250 is not executed. This is because input-side filtering is more effective for speeding up. To show an example of the effects of the present invention, a case will be considered where a packet to be output to one output interface (or output port) is subjected to filtering using the router 200 including the N interface units 210 and 2N input ports 201. At this time, if the destination decision and filtering unit 100 of each of the interface units 210 is to execute input-side filtering, the destination decision and filtering unit 100 only needs to execute filtering for an average of 1/(2N) of packets. For this reason, the routing table search unit 130 delivers about $(1+1/(2N))^{-1}$ times the performance delivered when only destination decision processing is executed. For example, if N=16, the routing table search unit 130 delivers about 0.97 times.

On the other hand, if the destination decision and filtering unit 100 is to execute output-side filtering, the interface unit 210 of each destination decision and filtering unit 100 of this embodiment includes two output interfaces, and thus, filtering is executed for an average of ½ of packets output from the interface unit 210. For this reason, the routing table search unit 130 delivers about 0.67 times the performance delivered when only destination decision processing is executed.

As described above, if the execution decision unit 115 has a piece of On/Off information for each output interface (or output port), degradation in performance caused by filtering can be prevented more effectively by executing input-side filtering by the destination decision and filtering units 100 in a distributed manner.

Cases have been explained where the execution decision unit 115 has a piece of On/Off information for each output port number. The execution decision unit 115 may have a piece of On/Off information for each output port number. At this time, the execution information table 1000-A has a piece of On/Off information for each output port number. In step 713, upon receipt of an output interface number and an output port number from the destination decision unit 123, the routing table search starting unit A (112) transmits the output port number to the execution decision unit 115. In step 714, it suffices that the execution decision unit 115 transmits a piece of On/Off information corresponding to the output port number to the routing table search starting unit A (112).

(2-2) Input-side filtering when filtering is turned on or off for each output interface (or output port) has been explained above particularly with reference to FIG. 7 or the like. Output-side filtering when filtering is turned on or off for each input interface (or input port) will then be explained. A case will be considered where the same network as that in FIG. 1 is used, and the router R0 executes filtering only for a packet input from the IX, i.e., the network whose interface number is 3. In this case, pieces of execution information in the execution information table 1000-A are all Off. The destination decision and filtering unit 100 decides that all packets input from the corresponding ones of the input ports 201 are intended for "forwarding." Each of the packets passes through the packet forwarding unit 250 and is forwarded to the packet transmitting/receiving circuit 230 on the output side. The packet transmitting/receiving circuit 230 stores the packet and at the same time transmits information in the internal header unit 330 and header unit 310 to the destination decision and filtering unit 100.

Figure 12:
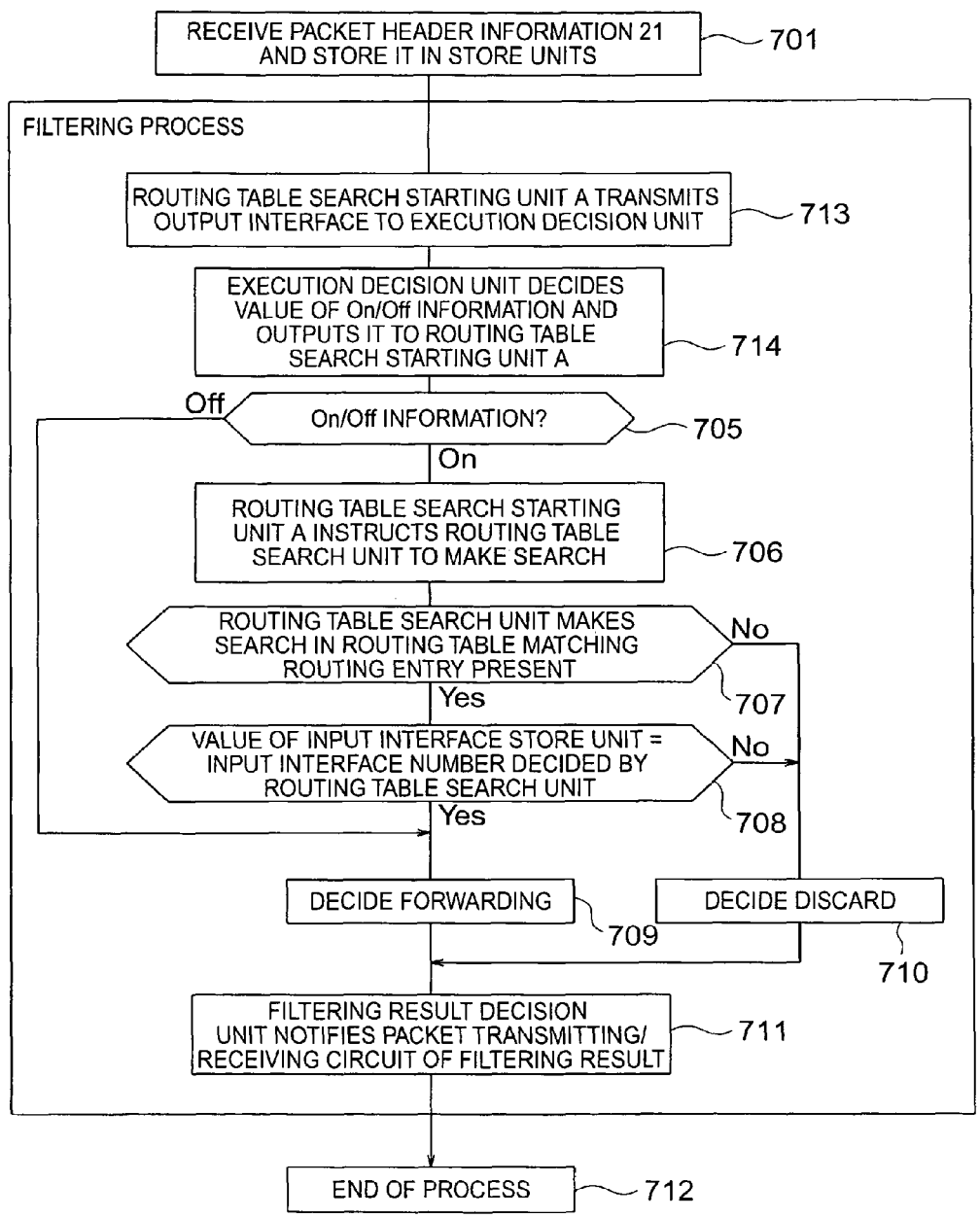
FIG. 12 is a flowchart showing an example of output-side filtering processing of the destination decision and filtering unit 100.

The output-side filtering operation of the destination decision and filtering unit 100 will be explained with reference to the flowchart shown in FIG. 12. The flowchart is different from the flowchart of the processing of the destination decision and filtering unit 100 for a packet input from one of the input ports 201 illustrated in FIG. 7 and shows a process flow in which the destination decision process (steps 702 to 704) is omitted, and in step 714 described above, the execution decision unit 115 reads out a piece of On/Off information corresponding to an input interface (or input port number) from the execution information table 1000-B with the same format as that of the execution information table 1000-A and transmits it to the routing table search starting unit A (112). The other operations are the same as those of input-side filtering.

(2-3) Cases have been explained above where the execution decision unit 115 turns on or off a piece of On/Off information for each input interface (input port) or output interface (output port), particularly with reference to FIG. 11 or the like. An example will then be explained where a piece of On/Off information is turned on or off for each flow. A flow here refers to a flow sequence for a packet decided from at least one of packet header information, an input interface (or input port), and an output interface (or output port). As examples of a flow, there can be considered one for a pair of an input port and an output port, one for a pair of an input interface and an output interface, and one for a pair of a source address and a destination address which, however, are not limitative. By turning on or off a piece of On/Off information for each flow, an ISP can provide, for a user, an additional communication service which executes filtering for a specific flow. For example, if the ISP ISP-A provides, for a user having the terminal T1 (whose IP address is 14.15.1.1), an additional communication service which executes filtering for a packet received from the terminal T5 (whose IP address is 19.20.1.1), it suffices that the router R0 executes filtering for a packet with an input port number of 3, a destination IP address of 14.15.1.1, and a source IP address of 19.20.1.1.

Figures 13, 14:
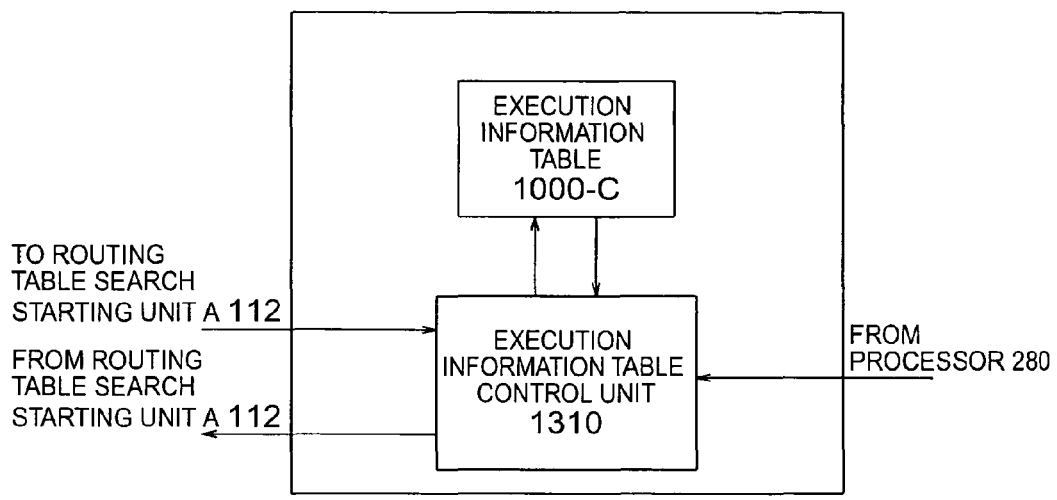
FIG. 13 is a block diagram showing another example of the configuration of the execution decision unit 115 of the destination decision and filtering unit 100.
FIG. 14 is a table chart showing an example of an execution information table 1000-C of the execution decision unit 115.

FIG. 13 shows an implementation example of the execution decision unit at this time. The execution decision unit 115 in FIG. 13 is composed of an execution information table control unit 1310 and an execution information table 1000-C shown in FIG. 14. The execution information table 1000-C in FIG. 14 has a format used to decide, on the basis of the source IP address (SIP), destination IP address (DIP), and input port number of a packet, whether to execute filtering for the packet. Each of entries 1001-C of the execution information table 1000-C, any of which is denoted by 1001-Ci (i is an integer equal to or larger than 1) and stores a SIP, a DIP, and an input port number as a SIP condition, a DIP condition, and an input port number condition, respectively.

As operation when a packet is input, it suffices that the following processing is executed in step 714 described above. More specifically, in step 714, the execution information table control unit 1310 reads out the entries 1001-C from the execution information table 1000-C in order from one with the smallest address. The execution information table control unit 1310 compares corresponding pieces of information in the storing units 111, 114, and 116 and an output interface store unit 115A with the SIP condition, DIP condition, and input port number condition of each read-out entry 1001-Ci to retrieve a matching entry 1001-Ci. If there is any matching entry 1001-Ci, the execution information table control unit 1310 decides that a corresponding piece of On/Off information is On; otherwise, Off. The execution information table control unit 1310 transmits the piece of On/Off information to the routing table search starting unit A (112).

In step 714, the execution information table control unit 1310 needs to read out the entries 1001-C one by one and compare each read-out entry 1001-Ci with the source address. Accordingly, the performance of the execution decision unit 115 degrades with increasing number of the entries 1000-C. To turn on or off filtering for any one of each of input interfaces, each of input ports, each of output interfaces, and each of output ports, it is preferable to use the execution information tables 1000-A and 1000-B.

Assume a case where a port between the IX and the router R0 is physically implemented by a plurality of ports using a technique such as link aggregation (802.3ad). In this case, if the router R0 executes filtering for a packet originating from the terminal T1 and destined for the terminal T5, filtering needs to be executed for packets input from a plurality of input ports. In such a case, it suffices that a plurality of conditions can be designated as input port number conditions of each entry 1001-Ci.

A case has been described where the value of a piece of filtering On/Off information is decided on the basis of the source IP address (SIP), destination IP address (DIP), and input port number of a received packet. The execution decision unit of the present invention can also decide the value of the piece of On/Off information on the basis of other pieces of information such as the destination MAC address and source MAC address.

As described above, if an output interface and an output port number are stored as conditions of each entry 1001-Ci, input-side filtering causes less degradation in performance than that caused by output-side filtering. On the other hand, if an input interface number and an input port number are stored as conditions of each entry 1001-Ci, it is more preferable to execute output-side filtering.

(3) Setting of Execution Information Table of Execution Decision Unit

Figure 15:
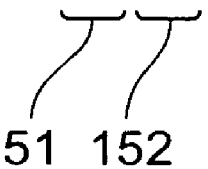
FIG. 15 shows examples of an input command to set the execution information table 1000-A and an execution information table 1000-B.

The administrator of the ISP ISP-A sets the execution information tables 1000-A and 1000-B from a control terminal 10 outside the router 200. FIG. 15 shows examples of a command input to the control terminal 10 at the time of setting of the execution information tables 1000-A and 1000-B. The "out_interface_filter" commands are ones to set pieces of On/Off information for respective output interfaces in entries 1001-A1 and 1001-A2 and the entry 1001-A3.

Reference numeral 151 denotes an output interface number; and 152, a piece of On/Off information. The commands in the first and second lines are intended to set the pieces of On/Off information for interfaces Nos. 1 and 2 as the output interfaces to Off, and the command in the third line is intended to set the piece of On/Off information for interface No. 3 as the output interface to On. To set a piece of On/Off information for each output interface, input port, and output port, an "in_interface_filter" command, an "in_port_filter" command, and an "out_port_filter" command are respectively used instead of an "out_interface_filter" command.

Figure 16:
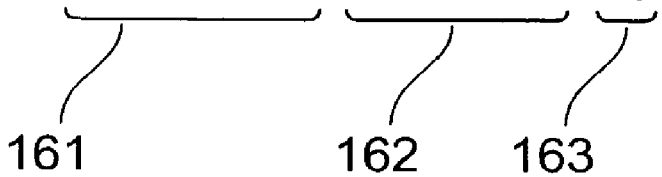
FIG. 16 shows an example of an input command to set the execution information table 1000-C.

FIG. 16 shows an example of a command, a "flow_filter" command which is used to set the execution information table 1000-C. The command in FIG. 16 is used to set an entry 1001-C1. Reference numeral 161 denotes a SIP condition; 162, a DIP condition; and 163, an input port number condition.

Upon receipt of a command, the processor 280 transmits receipt information to the execution decision unit and an instruction to write the information to the execution information table 1000-C. The execution information table control unit in the execution decision unit writes the receipt information in the execution information table 1000-C.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A forwarding device which forwards a packet, comprising:
a packet receiving unit which receives a first packet from a port and specifies input source information of the first packet;
a routing information unit having routing information of address information and first output destination information corresponding to the address information;
a output destination decision unit for searching, based on destination address information included in the first packet, the routing information for first output destination information corresponding to the destination address information;
a filtering decision unit for deciding whether or not to execute filtering to the first packet on the basis of the first output destination information; and
a filtering execution unit for searching, when the filtering decision unit decides to execute filtering to the first packet, based on source address information included in the first packet, the routing information for second output destination information corresponding to the source address information,
wherein the filtering execution unit decides whether or not the second output destination information matches the input source information of the first packet received by the packet receiving unit;
wherein, when the filtering decision unit decides that the second output destination information matches the input source information, the filtering execution unit allows forwarding the first packet, whereas, when the filtering decision unit decides that the second output destination information does not match the input source information, the filtering execution unit discards the first packet.

2. The forwarding device according to claim 1, wherein the output destination information includes an interface number indicating a network to which the first packet is to be output, an output port number indicating a number of a port to which the first packet is to be output, and at least a part of a next hop address indicating an address of a next forwarding device to which the first packet is to be transmitted.

3. The forwarding device according to claim 1, wherein the input source information of said receiving unit includes one of an input port number indicating a number of a port from which the first packet is input and an input interface number indicating a number of an interface from which the first packet is input.

4. A forwarding device which forwards a packet, comprising:
a packet receiving unit which receives a first packet from a port and specifies input source information of the first packet;
a routing information unit having routing information of address information and first output destination information corresponding to the address information;
a output destination decision unit for searching, based on destination address information included in the first packet, the routing information for first output destination information corresponding to the destination address information;
a filtering decision unit for deciding whether or not to execute filtering to the first packet on the basis of the input source information of the first packet; and
a filtering execution unit for searching, when the filtering decision unit decides to execute filtering to the first packet, based on source address information included in the first packet, the routing information for second output destination information corresponding to the source address information,
wherein the filtering execution unit decides whether or not the second output destination information matches the input source information of the first packet received by the packet receiving unit;
wherein, when the filtering decision unit decides that the second output destination information matches the input source information, the filtering execution unit allows forwarding the first packet, whereas, when the filtering decision unit decides that the second output destination information does not match the input source information, the filtering execution unit discards the first packet.

5. The forwarding device according to claim 4, wherein the output destination information includes an interface number indicating a network to which the first packet is to be output, an output port number indicating a number of a port to which the first packet is to be output, and at least a part of a next hop address indicating an address of a next forwarding device to which the first packet is to be transmitted.

6. The forwarding device according to claim 4, wherein the input source information of said receiving unit includes one of an input port number indicating a number of a port from which the first packet is input and an input interface number indicating a number of an interface from which the first packet is input.

* * * * *